US008045457B1

(12) United States Patent
Satish et al.

(10) Patent No.: US 8,045,457 B1
(45) Date of Patent: Oct. 25, 2011

(54) DROPPING PACKETS TO PREVENT UNAUTHORIZED DATA TRANSFER THROUGH MULTIMEDIA TUNNELS

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 554 days.

(21) Appl. No.: 11/478,786

(22) Filed: Jun. 29, 2006

(51) Int. Cl.
*G06F 11/00* (2006.01)
*G06F 15/16* (2006.01)
*G06F 7/04* (2006.01)

(52) U.S. Cl. ............ 370/230; 370/392; 726/11; 726/26

(58) Field of Classification Search .................. None
See application file for complete search history.

(56) References Cited

U.S. PATENT DOCUMENTS

| 6,690,645 | B1 * | 2/2004 | Aweya et al. ................. 370/230 |
| 7,362,707 | B2 * | 4/2008 | MeLampy et al. ............ 370/235 |
| 7,386,889 | B2 * | 6/2008 | Shay .............................. 726/26 |
| 2002/0188648 | A1 * | 12/2002 | Aweya et al. ................. 709/102 |
| 2003/0081546 | A1 * | 5/2003 | Agrawal et al. ............... 370/229 |
| 2003/0154399 | A1 * | 8/2003 | Zuk et al. ..................... 713/201 |
| 2003/0165136 | A1 * | 9/2003 | Cornelius et al. ............. 370/356 |
| 2004/0003069 | A1 * | 1/2004 | Wong ............................ 709/223 |
| 2004/0019781 | A1 * | 1/2004 | Chari et al. .................... 713/153 |
| 2004/0049596 | A1 * | 3/2004 | Schuehler et al. ............. 709/238 |
| 2004/0123142 | A1 * | 6/2004 | Dubal et al. ................... 713/201 |
| 2005/0166123 | A1 * | 7/2005 | Yanamoto et al. ............. 714/776 |
| 2005/0216770 | A1 * | 9/2005 | Rowett et al. .................. 713/201 |
| 2005/0220019 | A1 * | 10/2005 | Melpignano ................... 370/232 |
| 2005/0232151 | A1 * | 10/2005 | Chapweske et al. ........... 370/231 |
| 2006/0005238 | A1 * | 1/2006 | Izatt et al. ....................... 726/12 |
| 2006/0153174 | A1 * | 7/2006 | Towns-von Stauber et al. ............................ 370/356 |
| 2006/0187927 | A1 * | 8/2006 | MeLampy et al. ............. 370/389 |
| 2007/0064610 | A1 * | 3/2007 | Khandani et al. ............. 370/235 |
| 2007/0091808 | A1 * | 4/2007 | Raftelis ......................... 370/235 |
| 2007/0110053 | A1 * | 5/2007 | Soni et al. ..................... 370/389 |
| 2007/0147380 | A1 * | 6/2007 | Ormazabal et al. ........... 370/392 |
| 2007/0258456 | A1 * | 11/2007 | Khouderchah et al. ........ 370/392 |
| 2008/0262990 | A1 * | 10/2008 | Kapoor et al. ................... 706/20 |
| 2010/0011115 | A1 * | 1/2010 | Kliland et al. ................. 709/230 |

OTHER PUBLICATIONS

Student Innovations at the Center for Professional Development. "VoIP Security: Masquerading Data as RTP Media Stream."
Gene Yahnes. "Securing the RTP Stream . . . 'Slaying Steganography.' " Downloaded Jun. 14, 2006 from http://ewh.ieee.org/r4/chicago/recent.html.

* cited by examiner

*Primary Examiner* — Chirag Shah
*Assistant Examiner* — Suk Jin Kang
(74) *Attorney, Agent, or Firm* — Wilmer Cutler Pickering Hale and Dorr LLP (57) ABSTRACT

Intentionally dropping packets to prevent unauthorized transfer of data through multimedia tunnels is disclosed. A stream of media transport protocol packets is received. One or more packets are dropped intentionally from the stream to render unusable at the destination a file or other data transported through the multimedia tunnel without authorization.

18 Claims, 6 Drawing Sheets

DROPPING PACKETS TO PREVENT UNAUTHORIZED DATA TRANSFER THROUGH MULTIMEDIA TUNNELS

BACKGROUND OF THE INVENTION

Network protocols used to transport media content, such as audio and/or video content associated with a voice over Internet protocol (VoIP) call, are susceptible to being misused for unauthorized transfers of files or other data to and/or from a target host. In one data theft exploit, a real-time protocol (RTP) connection established to facilitate a VoIP call is used to transfer a file from a target host to a remote host, e.g., by intermingling packets containing the file data with packets generated by the VoIP application running at the target host to transfer to a remote call participant at the remote host audio content (e.g., voice) received as input (e.g., spoken into a headset, microphone, or handset) at the target host. A similar approach could be used to transport malicious code to a target host without detection.

Such exploits are possible because network and host-based security measures, e.g., firewalls, gateways, intrusion detection/prevention systems and applications, etc., typically are configured to allow RTP connection related traffic to pass without analyzing the content of each packet (or the stream of packets together) to verify that only legitimate audio (e.g., voice) data is being transferred. Packet content is not typically examined in part due to the time and resources that would be required to decode each packet and perform a meaningful analysis of its content.

One solution that has been proposed is to "salt" the data being encoded by the application implementing the media transfer protocol on the sending host, prior to encoding, with bogus data. The presence of such bogus data typically would render it virtually impossible to reconstruct a file accurately at the receiving end. Media content, however, typically would not be rendered unusable and would instead be perceived and/or compensated for in the same way as other noise. However, the salting technique requires access to and extensive knowledge of the structure and operation of the encoding application, to be able to interleave bogus data bits with other data prior to encoding. Also, it can only be implemented at the sending host, making it unsuitable for some enterprise environments, or at least less desirable than an approach that could be implemented centrally at a firewall, gateway, network appliance, etc., and rendering it ineffective for defeating unauthorized transfers from a remote host of malicious code.

Therefore, there is a need for an effective way to defeat attempts to send or receive unauthorized data via media content transfer tunnels/protocols.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dropping packets to render unusable at the receiving end code or files transferred without authority via a media transport protocol connection is disclosed. In some embodiments, a stream of media transport protocol packets being transmitted to a remote destination is received. One or more packets in the stream are dropped and not transmitted and/or forwarded to ensure that code or files being sent without authority via an associated connection, if any, would not be usable at the receiving end. In some embodiments, the transmitting and receiving ends cooperate to enable the receiving end to anticipate the packets being dropped and compensate for them, if appropriate, when rendering media content (e.g., audio, video, both) being received via the connection. In some embodiments, packets are dropped at the receiving end. In various embodiments, packets are dropped at random, periodic, and/or dynamically determined intervals. In some embodiments, a packet to be dropped is selected at random from within a sliding window of packets.

Figure 1:
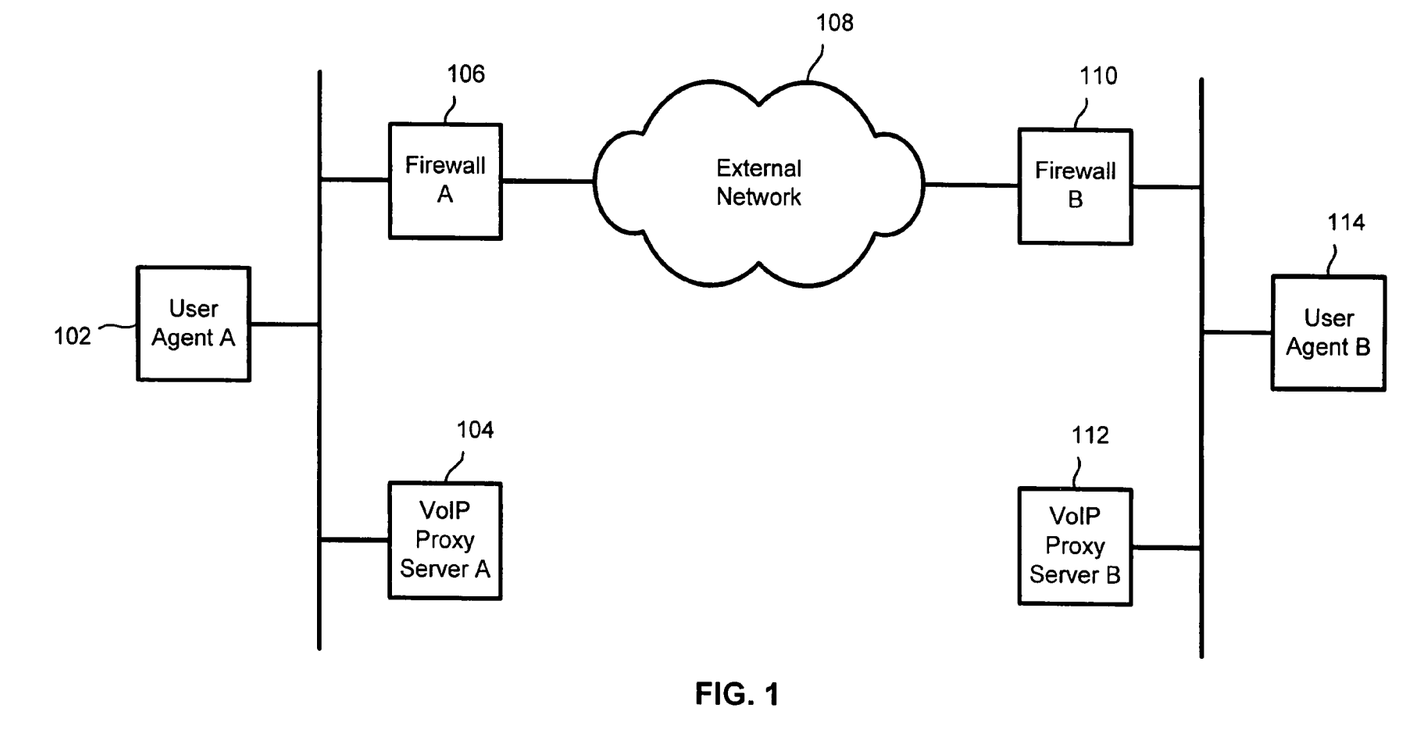
FIG. 1 is a block diagram illustrating an embodiment of a network environment.

FIG. 1 is a block diagram illustrating an embodiment of a network environment. In the example shown, a first user agent 102 associated with an internal (e.g., enterprise) network "A" and a first VoIP proxy server 104 have access via a first firewall 106 to an external network 108. A second user agent 114 and second VoIP proxy server 112 associated with an internal (e.g., enterprise) and/or carrier/provider network "B" have access to external network 108 via a second firewall 110. The user agents 102 and 114 may be any host configured to} send/receive media content (e.g., audio, video, both) using a media content transport protocol, such as the real-time protocol (RTP) commonly used to transport VoIP call content.

In the example shown in FIG. 1, to establish a call to a participant associated with user agent 114, a participant at user agent 102 would provide to user agent 102 call participant identification information (e.g., b@b.com) associated with the destination desired to be called. The user agent 102 would pass the call destination identification information to proxy server 104 in a call "invite" request, which would in turn send the "invite" (either directly or indirectly) to proxy server 112. Proxy server 112 would determine, e.g., via a query to a location service, that the call destination identification information is currently associated with user agent 114 and pass the "invite" to user agent 114. If the call were accepted by the participant associated with user agent 114, an "ok" reply would be sent by user agent 114 via proxy server 112 and proxy server 104 to user agent 102. A three-way call establishment handshake would then be completed by the user agent 102 sending directly to user agent 114, via firewall 106, external network 108, and firewall 110, in this example, but not involving proxy servers 104 and/or 112, an acknowledgement ("ack") message. Once the three way handshake has been completed, an RTP session (sometimes referred to herein as an RTP "tunnel") would be established to transport call content (e.g., voice or other audio) directly between user agent 102 and user agent 114.

As described above, the RTP connection established between VoIP call endpoints may be misused to tunnel non-call-related data (e.g., malicious code, a file desired to be stolen, etc.) from one call endpoint host to the other. While all traffic associated with the call (or other session or connection in which media content is transported) in this example passes through firewalls 106 and 110, typically only limited inspection of such call traffic would occur. For example, the firewalls 106 and/or 110 may be configured to ensure that only RTP packets are sent via the connection, they typically would not be configured to perform any analysis, nor even to decode and access, the actual payload of such packets, e.g., to ensure that only call data is being sent/received.

Dropping packets to render unusable at the receiving end data sent via a media transport protocol/connection without authorization is disclosed. Typically, applications that rely on network transport of media content are tolerant to at least a degree to the loss of an occasional packet in transport, etc. In the case of the RTP, for example, data typically is sent via a UDP connection, which does not guarantee delivery of each packet. At the receiving end, therefore, the application responsible for receiving a stream of packets comprising media content, extracting their content, and ultimately rendering the media content to an end user, are configured to employ various tools and techniques to compensate for the occasional lost (or otherwise missing) packet. The approximation (e.g., interpolation) and other techniques used to fill such gaps typically result in an adequately satisfactory user experience, and that some miniscule amount of data is missing may not be perceptible at all, especially to users conditioned by past experience with imperfect communication channels (e.g., cell phones, broadcast radio, etc.) to ignore imperfections in media content as rendered. On the other hand, as noted above data integrity is more critical with respect to data that is not media content, such as executable code, non-media data files (e.g., documents), etc. For such data, even a single dropped packet may render the entire file unusable at the receiving end by making it impossible to reconstruct the code or file in any meaningful way. The techniques disclosed herein take advantage of the above asymmetry by intentionally dropping one or more packets comprising a stream of media transport protocol packets.

Figure 2A:
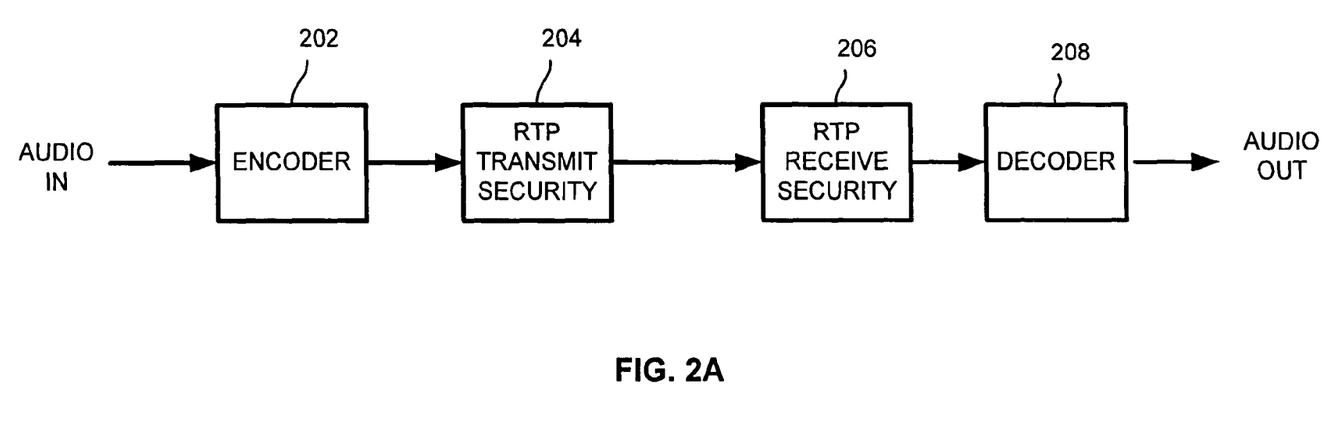
FIG. 2A is a block diagram illustrating an embodiment of a system in which agents at the transmitting and receiving ends cooperate to drop one or more packets comprising a stream of media transport protocol packets.

FIG. 2A is a block diagram illustrating an embodiment of a system in which agents at the transmitting and receiving ends cooperate to drop one or more packets comprising a stream of media transport protocol packets. In the example shown, an encoder 202 and RTP transmit security module 204 are associated with transmitting media content, in this example audio content, to a remote host with which an RTP receive security module 206 and decoder 208 are associated. The encoder 202 in various embodiments comprises an application or other software configured to receive raw (e.g., analog) audio content, convert it to digital form, break the digitized content into discrete units, and send the resulting stream each discrete units to a remote destination as a stream of media transport protocol packets. In the example shown, the output of encoder 202 comprises a stream of such media transport protocol packets, e.g., a stream of RTP packets.

In the example shown in FIG. 2A, the RTP transmit security module 204 and the RTP receive security module 206 cooperate to drop packets to render unusable at the receiving end any code or other non-media content data sent via the media transport protocol connection ostensibly established to transport call (or other media) content between a local station with which encoder 202 and RTP transmit security 204 are associated and a remote station with which RTP receive security 206 and decoder 208 are associated. In some embodiments, RTP transmit security module 204 negotiates a packet dropping algorithm and/or parameter(s) with RTP receive security module 206, which enable RTP receive security module 206 to anticipate which packets will be dropped. Examples of a negotiated algorithm/parameter include negotiating a size of a sliding window of packets, exchanging a list of sequence numbers to be dropped, determining a periodicity or frequency with which packets will be dropped, exchanging a seed to be used to generate a random/pseudorandom number or numbers to be used to select packets to be dropped, etc. RTP receive security module 206 and decoder 208 in various embodiments use knowledge of which packets will be dropped to avoid waiting for packets that are known to have been dropped (e.g., never sent) at the transmit end and/or to perform without delay processing required to compensate, for example in decoding, reassembling, rendering, etc., for data that will not be received as a result of packets being dropped.

The RTP transmit security module 204 may be implemented on the media communication endpoint host (e.g., user agent 102 of FIG. 1) and/or at a switch, router, firewall, gateway, intrusion prevention/detection or other security system, and may be implemented entirely or in part as a software application, module, or process and/or a system, appliance, component, integrated or other circuit, and/or other hardware, software, and/or combination thereof. Likewise, RTP receive security module 206 may be implemented entirely or partly in software, hardware, or a combination of both, and may reside at the receiving endpoint host or at any point or points upstream of the receiving endpoint host.

Note that the approach illustrated in FIG. 2A is useful primarily to prevent theft of data from the transmit end. A hacker or other unauthorized user seeking to transfer malicious code to the receiving end likely would not have installed and/or permit to operate an RTP transmit security module 206.

In an alternative embodiment, not shown in FIG. 2A, the receiving end does not include an RTP receive security module 206. In such an embodiment, the RTP transmit security module 204 does not coordinate with an RTP receive security module, which is not present/available, and instead drops packets in accordance with a configured and/or dynamically determined algorithm that is not negotiated with the receiving end. In some such embodiments, the decoding and/or rendering application and/or system at the receiving end responds to intentionally dropped packets in the same manner as other dropped or otherwise missing packets/data, e.g., by using interpolation or other techniques, if configured/applicable, skipping over missing data, rendering blanks or silence when no data is available, etc. Such an approach may be used, for example, where the receiving end is not known or controlled by a third party, or where the overhead required to coordinate and/or anticipate the dropping of packets is deemed undesirable or of insufficient benefit.

Figure 2B:
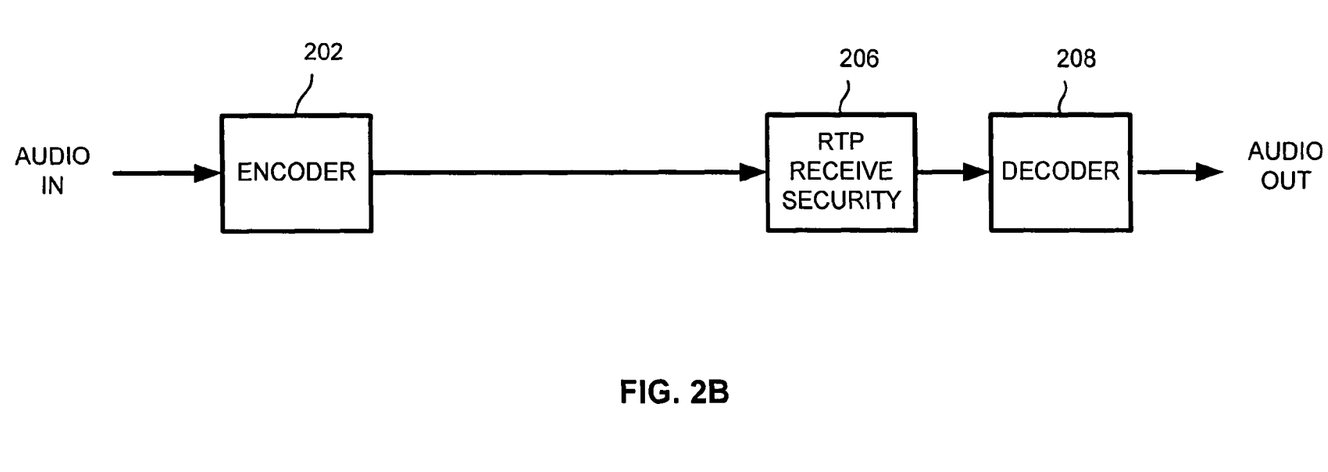
FIG. 2B is a block diagram illustrating an embodiment of a system in which an agent at the receiving end drops one or more packets comprising a stream of media transport protocol packets.

FIG. 2B is a block diagram illustrating an embodiment of a system in which an agent at the receiving end drops one or more packets comprising a stream of media transport protocol packets. In the example shown in FIG. 2B, there is no RTP transmit security module at the transmit end. Instead, the RTP receive security module 206 is configured to drop packets received via a media transport protocol/connection (e.g., at a random interval, randomly selected from within a sliding window at a prescribed periodicity, periodically, etc.). The approach shown in FIG. 2B is useful to ensure that any malicious code attempted to be inserted at the receiving endpoint host via the media transport protocol connection would be rendered useless and hence non-threatening. The approach shown in FIG. 2B has the advantage of not relying on any cooperation or action from the receiving end.

In some embodiments, if the far end does not support the media transport protocol security measures described herein, a variation of the approach shown in FIG. 2A that does not include/require RTP receive security module 206 is applied to data sent via a duplex (both transmit and receive) media transport protocol connection and the approach shown in FIG. 2B is applied to data received via the same connection. The former protects against data (e.g., file) theft and the latter against the insertion of malicious code. In some embodiments, if the far end does not support the media transport protocol security measures described herein, the approach shown in FIG. 2A is applied both to outbound and inbound communications. That is, for outbound communications an RTP transmit security module 204 at the near end cooperates with an RTP receive security module 206 at the far end, and for inbound communications an RTP transmit security module 204 at the far end cooperates with an RTP receive security module 206 at the near end.

Figure 3:
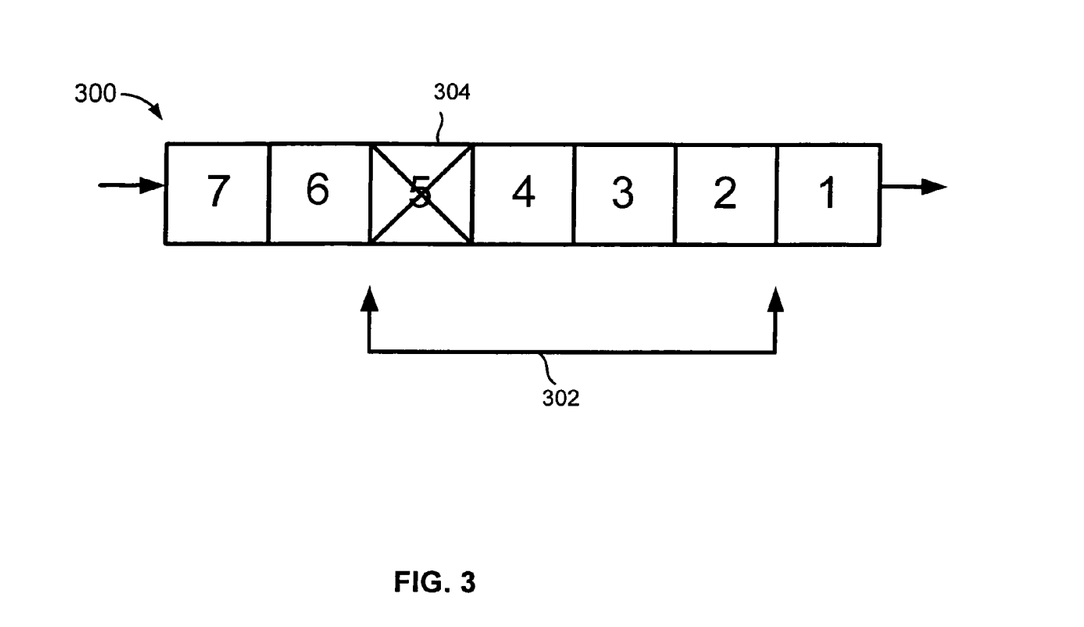
FIG. 3 is a block diagram illustrating an embodiment of a sliding window used to drop media transport protocol packets.

FIG. 3 is a block diagram illustrating an embodiment of a sliding window used to drop media transport protocol packets. In the example shown, a stream 300 of media transport protocol packets, labeled with sequence numbers 1 to 7 in the example shown, is displayed in relation to a sliding window 302. In various embodiments, the sliding window 302 advances with time at a prescribed and/or dynamically determined rate of time, as packets are received by a system and process with which the sliding window 302 is associated, etc. At a prescribed, negotiated, or otherwise dynamically determined time/frequency, a packet within the sliding window 302 is dropped. In the example shown, the packet 304 bearing sequence number 5 is indicated as having been dropped (or selected to be dropped). In various embodiments, the packet that is dropped is one located in a prescribed position within the sliding window (e.g., left most, or most recently entered the window, in the example shown), is selected at random from within the sliding window, or is selected from within the sliding window on some other basis.

Figure 4:
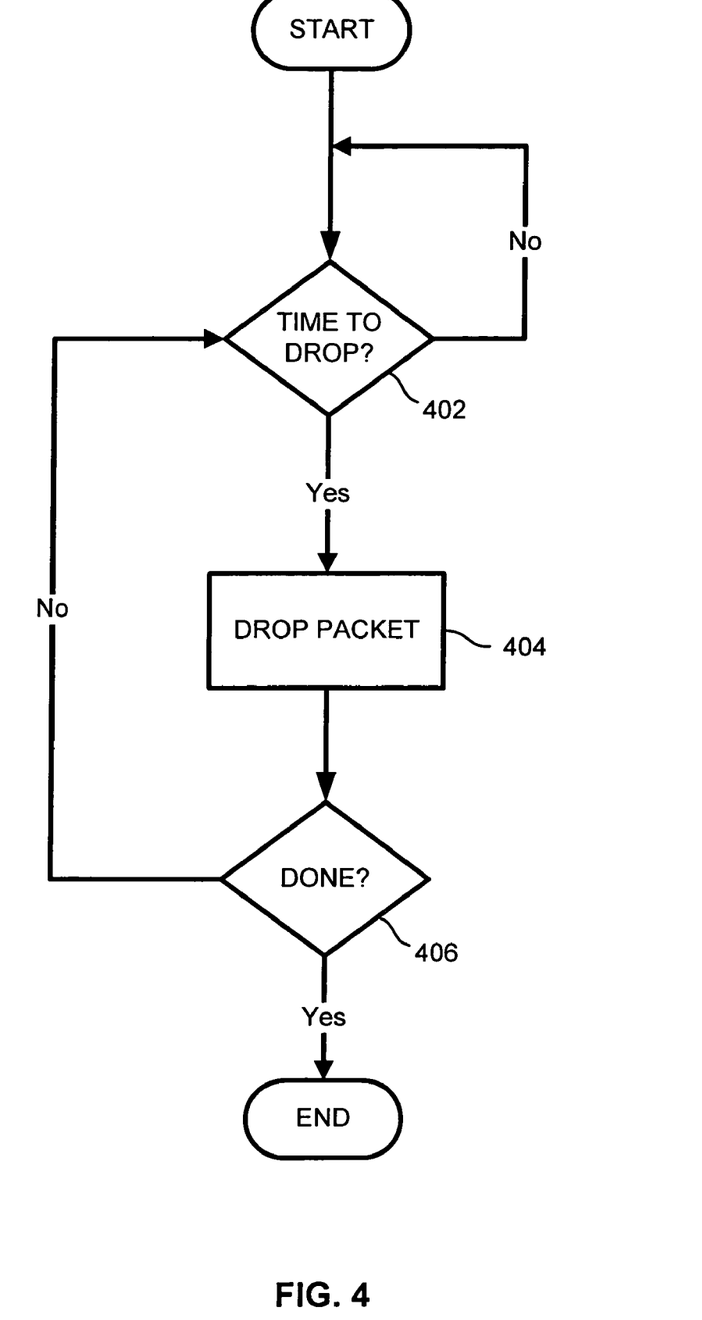
FIG. 4 is a flow chart illustrating an embodiment of a process for dropping media transport protocol packets.

FIG. 4 is a flow chart illustrating an embodiment of a process for dropping media transport protocol packets. In the example shown, when the time to drop a packet arrives (402), a packet is dropped (404). In various embodiments, the time to drop (402) is determined based on the passage of a prescribed, negotiated, randomly determined, randomly varying, or otherwise statically or dynamically period of time. In various embodiments, the packet to be dropped (404) is selected randomly from within a sliding window, is the packet most recently (or next) received by the system, module, or process implementing the process of FIG. 4, is a packet bearing a selected sequence number, etc. The process of periodically dropping a packet continues until the media transport protocol connection is closed (406).

Figure 5:
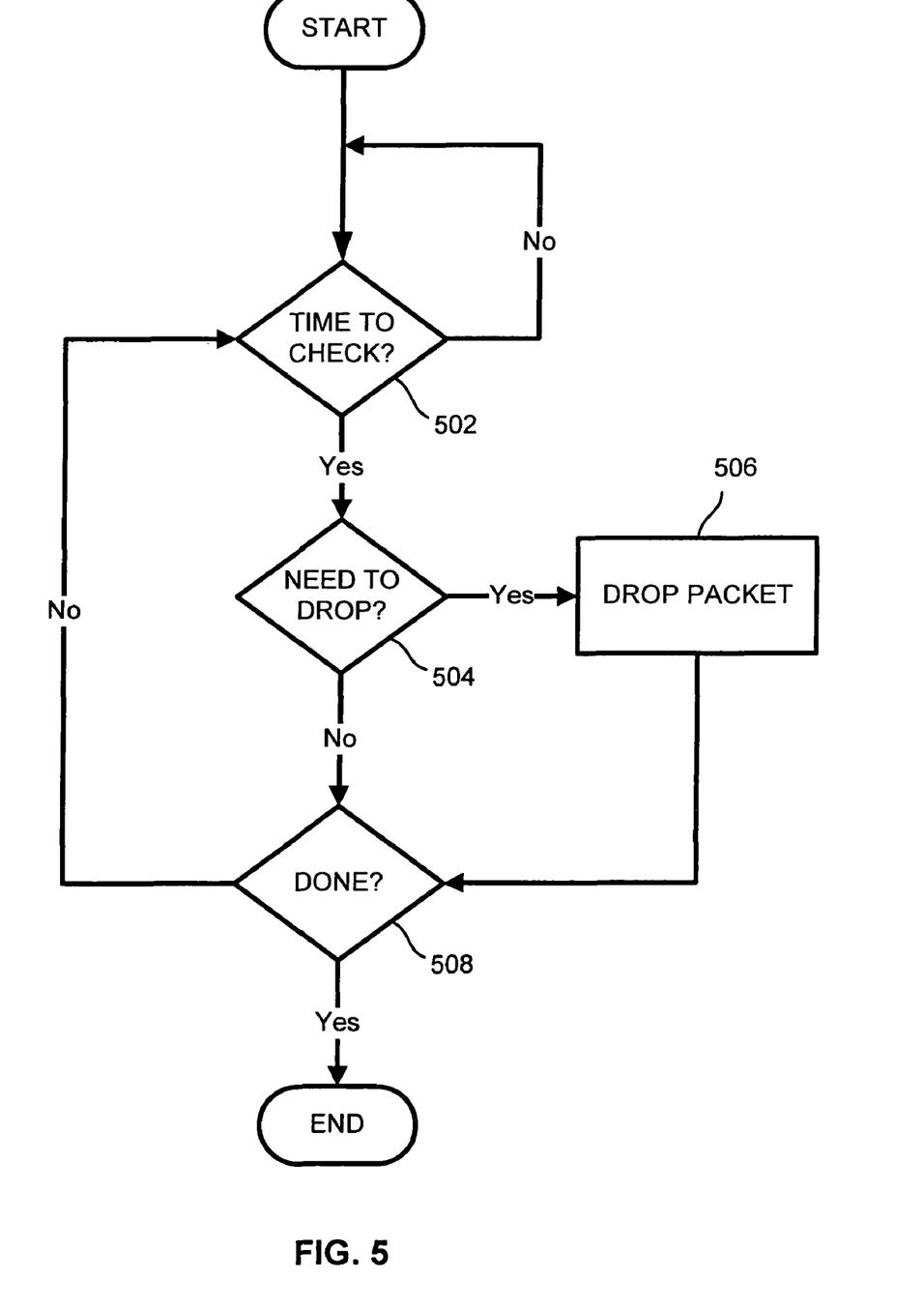
FIG. 5 is a flow chart illustrating an embodiment of a process for dropping media transport protocol packets.

FIG. 5 is a flow chart illustrating an embodiment of a process for dropping media transport protocol packets. In the example shown, when the time to check to determine whether a packet should be dropped arrives (502), it is determined whether a packet needs to be dropped (504). In some embodiments, if a packet within a sliding window of packets has not been received (e.g., has been delayed or lost in transit), such that a packet within the window is already missing, it is determined at 504 that it is not necessary to intentionally drop a packet within the sliding window at that time. If no packets have been lost or otherwise dropped, it is determined at 504 that it is necessary to drop a packet, and at 506 a packet is dropped. The process of periodically dropping a packet, if necessary, continues until the media transport protocol connection is closed (506). By dropping a packet only if none have been dropped otherwise, the approach of FIG. 5 avoids the risk of degrading the quality of the received media content as rendered beyond the degree necessary to avoid data theft and/or the insertion of malicious code.

Figure 6:
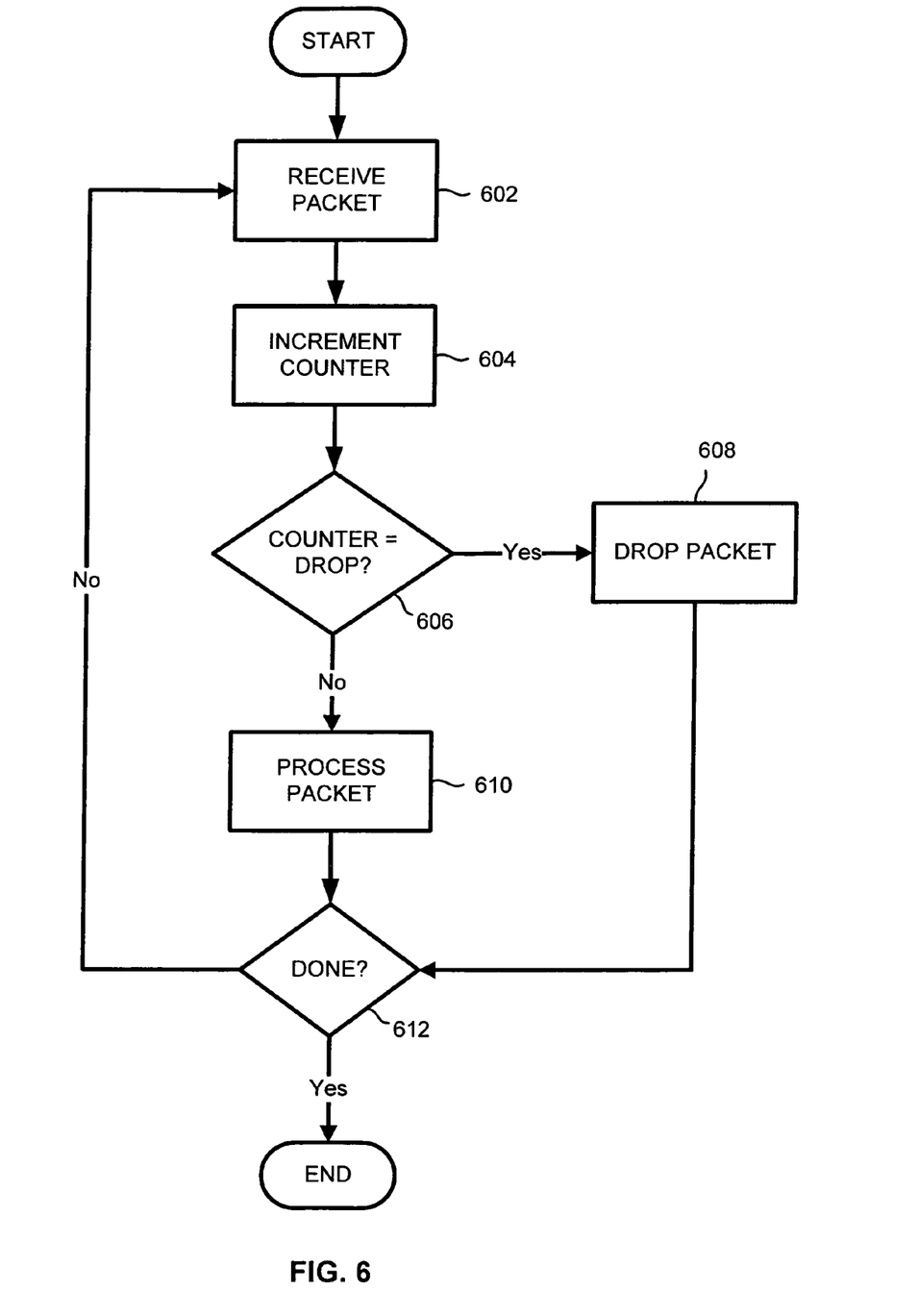
FIG. 6 is a flow chart illustrating an embodiment of a process for dropping media transport protocol packets.

FIG. 6 is a flow chart illustrating an embodiment of a process for dropping media transport protocol packets. In the example shown, a packet counter is used to determine which packet(s) to drop. When a packet is received (602) a counter is incremented (604). If the counter has reached a drop threshold (606), the packet is dropped (608) and the counter reset. Otherwise, the packet is processed normally (610). The process repeats for each subsequently received packet until the media transport protocol connection is closed (612). In some embodiments, the drop threshold value varies, e.g., randomly or in accordance with a prescribed and/or dynamically determined sequence of random or other values.

While certain of the examples described in detail involve VoIP and/or the RTP, the techniques described herein may be used with any media transport connection that is susceptible to being used to transfer unauthorized code or perform data theft and in which the intentional dropping of one or more packets would (at least likely) result in the unauthorized data being unusable at the receiving end for its intended purpose.

The approaches described herein have the advantage of not requiring that media transport protocol packets be decoded and/or their payload extracted and analyzed to detect and/or prevent unauthorized transport of data via media transport protocol connections.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing computer security, comprising:
receiving a stream of media transport protocol packets;
negotiating a packet dropping algorithm between sending and receiving ends of the stream;

identifying a packet to drop from the stream using the negotiated packet dropping algorithm, the negotiated packet dropping algorithm being independent of packet address information, packet port information, protocol type, packet content, traffic flow aggregation, and a network traffic level;

intentionally dropping the identified packet from the stream to reduce unauthorized use of the stream, wherein the unauthorized use is sensitive to dropping of the identified packet and an authorized use of the stream is not sensitive to dropping of the identified packet, wherein intentionally dropping a packet includes determining whether one or more packets within a prescribed window have been dropped unintentionally and intentionally dropping a packet only if no packet has been dropped unintentionally within the prescribed window; and allowing a plurality of other packets comprising the stream to be processed normally in accordance with the media transport protocol.

2. The method as recited in claim 1, wherein the media transport protocol packets comprise real-time protocol (RTP) packets.

3. The method as recited in claim 1, wherein the dropped packet is intentionally dropped at a host from which the stream of media transport protocol packets is intended to be sent to a remote destination.

4. The method as recited in claim 1, wherein the dropped packet is intentionally dropped at a node via which the stream of media transport protocol packets is intended to be sent to a remote destination.

5. The method as recited in claim 4, wherein the node comprises one or more of the following: a sending host, a switch, a router, a firewall, a gateway, a security appliance, an intrusion detection system, and an intrusion prevention system.

6. The method as recited in claim 1, wherein the dropped packet is intentionally dropped at a destination host to which the stream of media transport protocol packets has been sent.

7. The method as recited in claim 1, wherein the dropped packet is intentionally dropped at a node at a receiving end of an external network.

8. The method as recited in claim 1, wherein intentionally dropping a packet from the stream comprises dropping a packet from within a sliding window.

9. The method as recited in claim 1, wherein intentionally dropping a packet from the stream comprises dropping a packet randomly selected from within a sliding window.

10. The method as recited in claim 1, wherein intentionally dropping a packet from the stream comprises periodically dropping a packet from the stream.

11. The method as recited in claim 1, further comprising determining that the dropped packet has been dropped and compensating for a loss of data associated with the dropped packet.

12. The method as recited in claim 1, further comprising coordinating dropping the dropped packet with a receiving end to which the stream of media transport protocol packets is intended to be sent.

13. The method as recited in claim 1, wherein compensating for the loss of data comprises the use of interpolation.

14. A computer security system, comprising:
an interface configured to receive a stream of media transport protocol packets;
a processor coupled to the interface and configured to:
negotiate a packet dropping algorithm between sending and receiving ends of the stream;
identify a packet to drop from the stream using the negotiated packet dropping algorithm, the negotiated packet dropping algorithm being independent of packet address information, packet port information, protocol type, packet content, traffic flow aggregation, and a network traffic level, the processor further configured to:
intentionally drop the identified packet from the stream and allow a plurality of other packets comprising the stream to be processed normally in accordance with the media transport protocol, the dropping of the packet to reduce unauthorized use of the stream, wherein the unauthorized use is sensitive to dropping of the identified packet and an authorized use of the stream is not sensitive to dropping of the identified packet, wherein intentionally dropping a packet includes determining whether one or more packets within a prescribed window have been dropped unintentionally and intentionally dropping a packet only if no packet has been dropped unintentionally within the prescribed window.

15. The computer security system as recited in claim 14, wherein the system comprises one or more of the following: a sending host, a receiving host, a switch, a router, a firewall, a gateway, an intrusion detection system, and an intrusion prevention system.

16. The computer security system as in claim 14, wherein the processor is further configured to compensate for the loss of data using interpolation.

17. A computer program product for providing computer security, the computer program product being embodied in a non-transitory computer readable storage medium and comprising computer instructions for:
receiving a stream of media transport protocol packets;
negotiating a packet dropping algorithm between sending and receiving ends of the stream;
identifying a packet to drop from the stream using the negotiated packet dropping algorithm, the negotiated packet dropping algorithm being independent of packet address information, packet port information, protocol type, packet content, traffic flow aggregation, and a network traffic level;
intentionally dropping the identified packet from the stream to reduce unauthorized use of the stream, wherein the unauthorized use is sensitive to dropping of the identified packet and an authorized use of the stream is not sensitive to dropping of the identified packet, wherein intentionally dropping a packet includes determining whether one or more packets within a prescribed window have been dropped unintentionally and intentionally dropping a packet only if no packet has been dropped unintentionally within the prescribed window; and
allowing a plurality of other packets comprising the stream to be processed normally in accordance with the media transport protocol.

18. A method of providing computer security, comprising:
receiving a stream of media transport protocol packets;
negotiating a packet dropping algorithm between sending and receiving ends of the stream;
identifying a packet to drop from the stream using the negotiated packet dropping algorithm, the negotiated packet dropping algorithm being independent of packet address information, packet port information, protocol type, packet content, traffic flow aggregation, and a network traffic level;

determining whether one or more packets within a prescribed window have been dropped unintentionally;

intentionally dropping the identified packet from the stream, in the event that no packet has been dropped unintentionally within the prescribed window, to reduce unauthorized use of the stream, wherein the unauthorized use is sensitive to dropping of the identified packet and an authorized use of the stream is not sensitive to dropping of the identified packet; and allowing a plurality of other packets comprising the stream to be processed normally in accordance with the media transport protocol.

* * * * *